Aug. 6, 1929.                    H. H. BOETTCHER                    1,723,462
                                  BEET HARVESTER
                                Filed Feb. 15, 1928
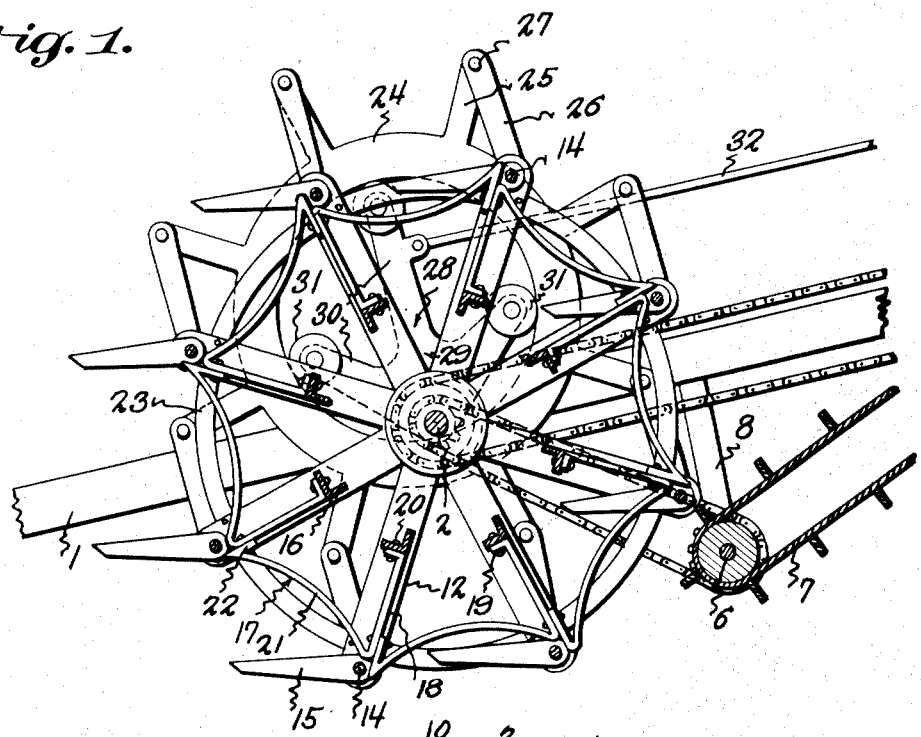
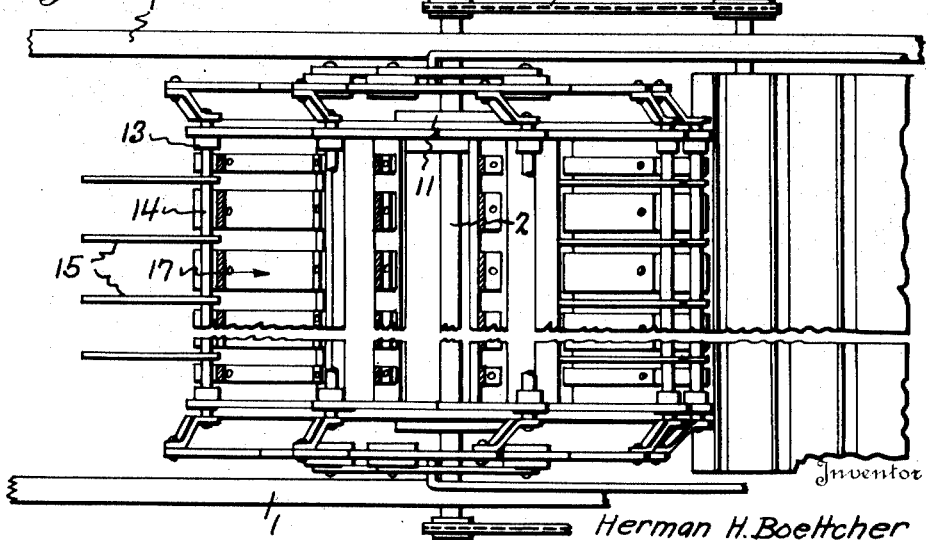
Inventor
Herman H. Boettcher
By Irving L. McCathran
                Attorney Patented Aug. 6, 1929.

1,723,462

UNITED STATES PATENT OFFICE.

HERMAN H. BOETTCHER, OF BLUE EARTH, MINNESOTA.

BEET HARVESTER.

Application filed February 15, 1928. Serial No. 254,565.

This invention relates to improvements in scooping machines and while the same is designed primarily as a beet harvester, may be put to other uses, and the invention constitutes, more specifically, an improvement on the digging and lifting mechanisms disclosed in my co-pending application filed January 31, 1927, Serial No. 164,948.

In the structure of the co-pending application a rotary drum is provided with a circumferential series of troughs, and teeth are supported at the sides of the troughs and means is provided, in the nature of a rotatably adjustable shifter, for effecting angular adjustment of the teeth to adapt the same to dig the beets, elevate the same, and deposit the same into the troughs from which they are delivered onto an endless conveyor apron. I have found however that in the arrangement disclosed in the said co-pending application, there is liability of the beets or other vegetables or other matter being delivered between the troughs and the lower end of the conveyor apron and thus returned to the ground surface. Therefore the present invention has, for its primary object, to provide a novel digging and elevating mechanism, in the combination recited above, so constructed and operating in such a manner as to insure of the deposit of the beets or the like directly onto the upper stretch of the endless conveyor without any likelihood of any of the beets or the like dropping from between the digging and elevating means and the lower end of the endless conveyor.

Another object of the invention is to provide a digging and lifting unit which will be exceptionally substantial in its construction, smooth and efficient in its operation, and capable of automatically handling the gathered beets or the like in a manner to insure against loss.

Another object of the invention is to provide a more certain and effective operation of the digging and lifting members of the structure and one which will insure against loss in the manner above stated.

While the accompanying drawings and the description which is to follow, constitute a disclosure of the preferred embodiment of the invention, it will be understood that various changes may be made within the scope of what is claimed.

In the accompanying drawings:

Figure 1 is a vertical front to rear sectional view through that portion of a beet harvester with which the present invention is concerned;

Figure 2 is a view partly in top plan and partly in section of the mechanism.

In the drawing the numeral 1 indicates the side members of a frame in which the gathering and lifting mechanism of the machine is mounted and which frame is downwardly and rearwardly inclined as shown in Figure 1 and in practice is mounted at its forward or upper end upon the main frame of the machine to provide for tilting adjustment and, at its rear end, is supported by a ground wheel with respect to which it is likewise adjustable to provide for variation in the position of the frame with respect to the ground surface and thus provide for raising and lowering of the gathering and elevating mechanism with respect to the ground surface. The numeral 2 indicates a shaft which is rotatably mounted in suitable bearings in the side members 1 of the frame and upon which shaft there is fixed, at each end, a sprocket gear 3 about which is trained a sprocket chain 4, each chain being trained likewise about a sprocket gear 5 which is fixed upon the corresponding end of the lower shaft 6 of an endless conveyor 7, the shaft 6 being journaled in suitable bearings at the lower ends of bracket arms 8 which are supported by and extend downwardly from the side members 1 of the said frame, the endless conveyor constituting the means for conveying the gathered beets or other vegetables or other objects, which have been deposited thereon by the operation of the gathering and lifting means, embodying the invention, and for elevating and depositing the beets onto a second conveyor (not shown) by which they are finally delivered into a wagon drawn along beside the machine, of the present invention, in the operation thereof. This construction is common to this type of machines and these details have been illustrated merely to demonstrate the arrangement and operation of the mechanism embodying the invention. At this point it is to be noted that the shaft 2 is driven by a sprocket chain 9 which is driven from any suitable source of power and trained about a sprocket gear 10 fixed upon one outer end of the shaft 2.

The digging and lifting mechanism comprises a pair of hubs 11 which are fixed upon the shaft 2 near the ends thereof, these hubs being provided with radial spokes 12 at the outer ends of which are bearings 13 in which bearings are journaled shafts 14 upon each of which shafts there is mounted a series of digging and elevating teeth indicated by the numeral 15, these teeth being fixed upon the respective shafts and extending radially therefrom in spaced parallel relation to one another throughout each series. The spokes 12 are relatively braced by angle iron bars 16 which extend between each two corresponding ones of the spokes and are secured at their ends thereto in any appropriate manner, the angle iron cross beams 16 being located approximately midway between the shaft 2 and the outer ends of the said spokes. The rotary supporting structure, thus provided, serves not only to support the shafts 14 carrying the digging and lifting teeth 15, but serves likewise to support receiving trays which are indicated in general by the numeral 17 and each of which trays consists of a plurality of bar metal sections each comprising a member 18 which is bent at one end to provide an attaching portion 19 riveted or otherwise secured as at 20 to one of the cross pieces 16, each tray comprising a series of the sections 17 secured at their ends 19 to a respective one of the cross bars 18. Each of the sections 17 further comprises a portion 21 which is formed by bending the bar metal from which the section is formed, at the outer end of the portion 18 thereof and on an arcuate line curving inwardly, the end of the bar at the outer end of the portion 21 thereof being bent acutely inwardly to provide an attaching portion 22 which is disposed against the rear side of the corresponding portion 18 of the respective one of the sections 17 of that series which is immediately in advance of the series referred to, in the direction of rotation of the entire assemblage. It will be observed by reference to Figure 2 of the drawing that the sections 17 of each tray are relatively spaced, being arranged in parallel vertical planes side by side, throughout the series, and, as clearly shown in Figure 2 of the drawing, the teeth 15 are so arranged that each tooth will be located between a pair of the said sections 17, and therefore the teeth, when angularly adjusted as will presently be described, may assume positions projecting outwardly beyond the respective trays or positions inwardly of the respective trays, the spaces between relatively adjacent ones of the sections 17 of each tray being of sufficient width to permit of the free movement of the corresponding series of teeth 15. It will now be evident that, while the sections 17 of each tray are of bar metal and relatively narrow, nevertheless the manner in which the sections are arranged and assembled provides a concave tray the bottom of which is substantially continuous and is yet of such construction as to permit of angular adjustment of the teeth 15 through the bottom of the tray to position outwardly beyond the tray and to position inwardly of the tray. Rims 23 are arranged at the opposite ends of the rotary support structure and against the outer faces of the spokes 12 near the outer ends thereof and are riveted or otherwise secured to the said spokes and these rims serve to relatively brace the spokes at each end of the structure.

In accordance with the principles of the invention, means is provided for effecting automatic rocking adjustment of the shafts 14, as the assemblage, above described, is rotated, in the travel of the machine over the ground surface, and this means will now be described. The means referred to includes rings 24 which are arranged each immediately outwardly of each end of the above described assemblage and eccentric with respect thereto and supported for rotation in a manner which will presently be described. Each ring 24 is provided about its periphery with a series of equi-distantly spaced radially extending arms 25 to the outer ends of which are connected links 26, as indicated by the numeral 27, the inner ends of the links being fixed to the adjacent ends of respective ones of the shafts 14. The rings 24 are rotatably supported and, as stated above, are eccentrically arranged with respect to the shaft 2 or in other words with respect to the axis of the rotary structure comprising the trays and the teeth 15, the axis of the rings 24 occupying a fixed position with respect to the shaft 2 except under conditions of adjustment of the rings as will presently be described. At this point it will be evident that as the heads of the rotary assemblage, including the hubs 11 and radial spokes 12 are rotated, carrying with them the trays 17 and teeth 15, the connecting links 26 which are fixed upon the shafts 14 and pivotally connected with the arms 25 upon the rings 24, will be adjusted so as to effect rotative adjustment of the said shafts and, by reason of the eccentric disposition of the rings 24 with respect to the axis of rotation of the digging and lifting assemblage, the teeth 15, as they near the ground surface, will be swung downwardly to enter and dig into the soil and remove the beets or the like to be harvested or removed. It will likewise be evident by reference to Figure 1 that as the assemblage rotates and the series of teeth 15 travel upwardly, they will maintain the same angular position with respect to the links 26 and will therefore maintain a position to support the beets or the like which have been removed from the soil. It will also be evident by reference to Figure 1 that as the teeth 15 reach the uppermost point of travel, they will begin to approach the respective trays and pass through the spaces between the sections 17 thereof thus depositing the beets or the like, which have been gathered, in the respective trays, and it will be particularly noted by reference to Figure 1 of the drawing that the teeth will be so angularly adjusted with respect to the respective trays, as they begin their downward travel about the shaft 2 as an axis, as to insure of all of the beets or the like, gathered thereby, being deposited in the respective trays and it will also be evident by reference to said figure that as each tray approaches the lower end of the endless conveyor 7, it will assume a position such as to insure of the beets or the like deposited therein being delivered onto the upper stretch of the conveyor long prior to the time at which each tray actually travels past the lower end of the conveyor. As a result of this construction and arrangement of parts, the delivery of all of the gathered beets or the like to the conveyor 7 is insured and there is no loss which is liable to be incurred, in the structure of the co-pending application, due to retention of the beets or the like by the rotary digging and lifting structure until such time as the trays of such structure have substantially passed the receiving end of the endless conveyor.

As in the co-pending application, the rings 24 are supported by spiders each including a body portion 29 which is mounted for rocking movement upon a respective end of the shaft 2, and arms 30 which radiate from the body of each spider and which support, at their outer ends, rollers 31 which contact the inner periphery of the respective ring 24 and thus support the ring for rotation. A rod 32 is connected to one arm of each of the spiders 28, and means (not shown) is provided whereby these rods 32 may be correspondingly adjusted so as to effect angular adjustment of the spiders 28 about the shaft 2 as an axis, it being understood that, so far as the present invention is concerned, any means, found suitable for the purpose, may be provided for effecting adjustment of the rods 32. In this adjustment of the rods the spiders 28 are correspondingly angularly adjusted about the shaft 2 and likewise, in this manner, the positions of the axis of the rings 24 with respect to the axis 2 is varied and in so adjusting the spiders and likewise adjusting the rings in the manner stated, the degree of angular disposition of the teeth with respect to the ground surface, as the teeth pass above said surface and begin their upward travel, may be varied, so that the teeth may be caused to dig to a greater or less depth in the soil as is found expedient.

Having thus described the invention, what I claim is:

1. In scooping and elevating mechanism of the class described, a rotary support, a circumferential series of trays supported thereby and having concave arcuate bottoms, a series of gathering and elevating teeth supported at the advancing side of each tray, means for automatically effecting continuous angular adjustment of the teeth in the rotation of the support to effect gathering of material from the soil and deposition of the material into the respective trays, and means for receiving the material from the trays.

2. In scooping and elevating mechanism of the class described, a rotary support, a circumferential series of trays supported thereby and having concave bottoms, each of said trays comprising a longitudinal series of relatively spaced sections, a series of gathering and elevating teeth supported at the advancing side of each tray and angularly adjustable in the planes of the spaces between the sections of the respective trays, means for automatically effecting continuous angular adjustment of the teeth, in the rotation of the support, to effect gathering of material from the soil and deposition of the material into the respective trays, and means for receiving the material from the trays.

3. In scooping and elevating mechanism of the class described, a rotary support, a circumferential series of trays supported thereby and of shallow concave form, each of said trays comprising a series of relatively spaced sections, a series of gathering and elevating teeth supported at the advancing side of each tray, and means for automatically adjusting the teeth, in the rotation of the support, in the planes of the spaces between the sections of each respective tray, to effect gathering of material from the soil and deposition of the material in the respective trays, and means for receiving the material from the trays.

4. In scooping and elevating mechanism of the class described, a rotary support, a circumferential series of trays supported thereby and of shallow concave form, a series of gathering and elevating teeth supported at the advancing side of each tray and angularly adjustable through the bottom of the tray, and means for automatically adjusting the teeth, in the rotation of the support, to effect gathering of material from the soil and deposition of the material into the respective trays.

5. In scooping and elevating mechanism of the class described, a rotary shaft, means for rotating the shaft, hubs fixed upon the shaft, spokes radiating from the hubs, cross bars extending between corresponding ones of the spokes, a circumferential series of trays each comprising a series of sections each having a supporting portion secured to a respective one of the cross members and a tray bottom forming portion extending on a concave arcuate line from the supporting portion to the supporting portion of the corresponding section of the next adjacent series of sections whereby to provide spaced bottom sections for each tray, a shaft rotatably supported at the advancing side of each tray, a series of teeth carried by each shaft for gathering and supporting material from the soil, means for automatically effecting continuous angular adjustment of said shafts to effect adjustment of each series of teeth continuously with respect to the respective tray bottom, whereby to provide for the collection of material by said teeth and the deposition of the material into the respective trays, and means for receiving the material from the trays.

In testimony whereof I affix my signature.

HERMAN H. BOETTCHER.